I. M. SEAMAN.
DENTAL PLUGGER AND BURRING TOOL.
No. 7,107. Reissued May 9, 1876.
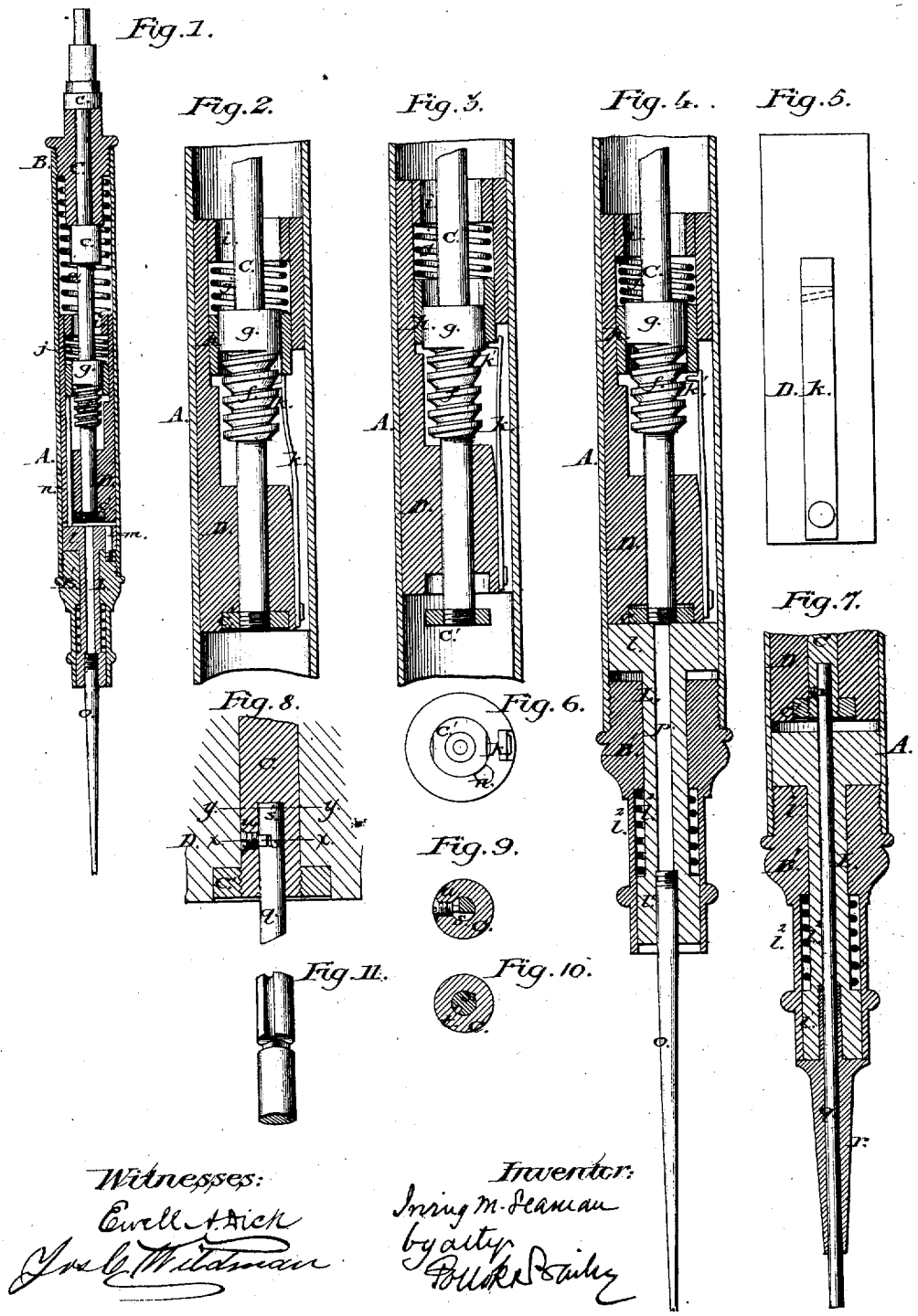
Witnesses:
Ewell & Dick
Jos. C. Whitaman
Inventor:
Irving M. Seaman
by atty
Burke & Bailey
N. PETERS, PHOTO-LITHOGRAPHER, WASHINGTON, D. C.

UNITED STATES PATENT OFFICE.

IRVING M. SEAMAN, OF BUFFALO, N. Y., ASSIGNOR, BY MESNE ASSIGNMENTS, TO JOHNSTON BROTHERS.

IMPROVEMENT IN DENTAL PLUGGERS AND BURRING-TOOLS.

Specification forming part of Letters Patent No. 131,123, dated September 3, 1872; reissue No. 7,107, dated May 9, 1876; application filed April 4, 1876.

*To all whom it may concern:*

Be it known that I, IRVING M. SEAMAN, of the city of Buffalo, in the county of Erie and State of New York, have invented certain new and useful Improvements in Dental Pluggers and Burring-Tools, of which the following is a specification:

My invention consists, first, in the combination, with the revolving shaft and hammer of a dental plugger, of a screw formed on said shaft, and terminating in a cylindrical enlargement, and a spring-tooth attached to said hammer and engaging with said screw, so that the hammer is elevated by the rotation of the latter until the spring-tooth runs out upon the cylindrical enlargement, when the hammer is disconnected from the screw and the blow struck; second, in the combination of a loose sleeve or collar fitting on the cylindrical enlargement, and held down in contact with the spring-tooth, by a spiral spring, so as to lock said tooth in its outer position when it runs out upon the cylindrical enlargement, thereby preventing the same from re-engaging with the screw during the downward movement of the hammer; third, in the combination, with the plugger-shaft, spring-tooth of the hammer, and the locking-spring sleeve, of a throat-pin or wire, attached to the plugger-spindle, for disengaging said sleeve from the spring-tooth, so as to permit the latter to re-engage with the screw of the plugger-shaft and elevate the hammer; fourth, in the combination, in a dental plugger, of a revolving shaft, provided with a tool-socket in its end, a hollow plugger-spindle, an outer locking-sleeve, and a burring-tool, passing through the sleeve-spindle, and engaging in the socket of the shaft, to adapt the plugger to be used as a drill; fifth, in the combination, with the lower end piece of the case and the hollow plugger-spindle, of a sleeve or collar, screwing into said spindle and against said end piece, so as to lock the spindle in its lower position, and prevent any receding movement thereof, thereby rendering the mechanism for raising the hammer in operation while using the plugger as a drill; sixth, in the combination, with the lower end piece of the case of the instrument and hammer, of the plugger-spindle, held down by a suitable spring, and provided with a guide-pin and wire for preventing the spindle and hammer from turning.

In accompanying drawing, Figure 1 is a sectional elevation of my improved instrument when used as a plugger. Fig. 2 is a sectional view, on an enlarged scale, of the hammer and operating parts when in their lowest position. Fig. 3 is a similar view, with the hammer raised. Fig. 4 is a sectional view, on an enlarged scale, of the lower portion of the instrument, showing the hammer in the act of striking the blow. Fig. 5 is an enlarged elevation of the hammer. Fig. 6 is a bottom-plan view thereof. Fig. 7 is a sectional view, on an enlarged scale, of the lower portion of the instrument, showing the same adapted to be used as a drill. Fig. 8 is an enlarged sectional elevation of the device for securing the drill in the revolving shaft. Figs. 9 and 10 are cross-sections on lines *x x* and *y y*, Fig. 1, respectively. Fig. 11 is a perspective view of the upper end of the drill-tool.

Like letters designate like parts in each of the figures.

A is the cylindrical case of the instrument; B B′, two plugs, screwing into the upper and lower ends thereof, respectively. The upper plug is provided with an axial bore, through which the shaft C passes, which latter is held against longitudinal movement therein by two collars, *c*, arranged in contact with the end of the plug B. The shaft C is connected, at the upper end, with any of the well-known devices used for driving dental burring-tools. D is the cylindrical hammer, fitting snugly in the case A, so as to be capable of longitudinal movement therein; and *e*, a spiral spring, arranged between the hammer and screw-plug B, so as to press the former downward. The shaft C extends through the hammer D, and is provided at its lower end with a screw-nut, *c′*, arranged in a recess or countersink in the end of the hammer, which recess exceeds slightly in depth the height of the nut *c′*. *f* is a screw, formed on the shaft C, within the hammer D. It is, preferably, made of a greater diameter than the shaft, and terminates at its upper end, or runs out into a cylindrical enlargement, *g*, the diameter of which exceeds that of the screw *f*.

*h* is a loose sleeve or collar, fitting on the enlargement *g*, and in a concentric recess formed in the upper portion of the hammer. *i* is a fixed sleeve, secured in the upper portion of said recess, and serving as an abutment for a spiral spring, *j*, arranged between the sleeves *i* and *h* for the purpose of pressing the latter downward. The hammer D is recessed or cut out around and below the screw *f* and enlargement *g*, so as to enable it to move vertically on the shaft C. *k* is the spring-arm, arranged in a longitudinal groove or recess in the hammer, and secured to the latter at its lower end. *k'* is a tooth, arranged near its upper end on the inner side. It forms part of a screw-thread, and engages with the screw *f*, as shown in Fig. 2, the upper face of the thread of the latter being made rectangular or downwardly-inclining to give the tooth *k'* a firm hold on the screw. The loose sleeve *h* is held in contact with the end of the spring-arm by the spiral spring *j*. L is the plugger-spindle, fitting in an axial bore provided in the lower screw-plug B'. It is constructed with a head, *l*, fitting in the case A, and an enlarged lower portion, $l^1$, fitting in a corresponding enlargement of the socket of the plug B'. $l^2$ is a spiral spring, arranged in the socket of the latter above the enlargement of the spindle L. It tends to hold the latter down with its head *l* in contact with the plug B', and away from the hammer D. *m* is a guide-pin projecting from the plug B' into the head of the spindle L, to prevent rotation of the latter. *n* is a wire, secured in the head *l* of the spindle, and projecting upwardly through a hole, *n'*, in the hammer to within a short distance from the loose sleeve *h*, as clearly shown in Fig. 1, for a purpose hereinafter to be explained. The spindle L is provided at its lower end with a screw-socket for the reception of the plugger-point *o*.

The operation of this part of my improvement is as follows: When the instrument is in its normal position, as shown in Fig. 1, the spindle L is in its lowest position, and the spring-toothed arm *k k'* locked in its outer position by the spring-sleeve *h*, so that the revolution of the shaft C has no effect whatever upon the hammer. The plugger-point *o*, inserted in the screw-socket of the spindle L, being placed upon the tooth, and a slight pressure applied thereto, the spring L is raised in its socket, compressing the spring $l^2$ so as to bring the head *l* within striking distance of the hammer, as shown in Fig. 4. By this receding movement of the spring L the wire *n*, attached thereto, raises the spring-sleeve *h*, so as to release the spring-tooth *k k'*, which latter engages with the screw *f*. The engagement of the tooth *k'* with the screw *f* causes the hammer to be elevated, compressing the spring *e* until the tooth reaches the point at which the screw *f* runs out upon the enlargement *g*, as shown in Fig. 3. In this position the tooth has been moved outwardly far enough to allow the spring-sleeve *h* to descend and engage between the end of the spring *k* and the enlargement *g*, resting against the tooth *k'*, and retaining the spring *k* in its outward position. The hammer, being thus disconnected from the screw *f*, is forced down by the reaction of the spring *e* upon the head *l* of the spindle L. As the hammer strikes the plugger-spindle the loose sleeve *h* comes in contact with the wire *n*, and is arrested in its movement thereby, or raised relatively, so as to become disengaged from the spring-hook *k k'*, when the tooth *k'* re-engages with the screw *f*, and the operation is repeated.

It is evident that when no pressure is applied to the plugger-point the spindle is not raised within striking distance of the hammer, and the last blow is received by the nut *c'*. The wire *n* not being raised sufficiently to disengage the loose sleeve *h* from the spring *k*, the tooth *k'* cannot re-engage with the screw *f*, and the hammer cannot be elevated again. The rotation of the shaft C, consequently, has no further effect upon the hammer, which is very desirable in handling and applying the instrument.

The instrument is adapted to be used as a burring-tool, in the following manner: P is an axial bore, provided in the spindle L for the passage of the drill *q*, and *r* is a guide-sleeve, provided with a similar axial bore and screwing into the socket of the spindle L, so as to bear with its shoulder against the end of the plug B', as shown in Fig. 7, whereby the spindle L is locked in its lower position, and longitudinal movement of the same prevented when pressure is applied thereto. The end of the drill that enters the socket is formed with a longitudinal passage for a projection on the interior of the socket. The passage is shown to consist of a groove, *t*, and the projection of a stud or screw-pin, *u*. The longitudinal passage terminates in a cross groove or cut, *s*, as clearly shown in Fig. 9. To enter the drill into the socket, the groove is made to coincide or register with the projection *u*, which will permit the drill to be inserted. When the projection reaches the end of the longitudinal groove, a turn of the tool in one direction or the other will bring the projection into the cross-groove, thus locking the tool in place. By making the cross-groove wedge shape or shallowing, as shown in Fig. 9, it will be noted that the projection will become jammed in the groove, thus causing a firmer interlocking of the tool and its rotary socket or holder. The screw-sleeve *r* locking the plugger-spindle in its lowest position, the operation of the instrument in this condition is consequently confined to the rotation of the shaft and drill, as in any ordinary burring instrument. This mode of fastening tools in rotary sockets or holders is advantageous on many accounts.

What I claim, and desire to secure by Letters Patent, is as follows:

1. The combination, with the revolving shaft and hammer of a dental plugger, of the screw *f*, enlargement *g*, and spring-tooth *k k'* substantially as and for the purposes set forth.

2. The combination, with the hammer provided with the spring-tooth *k k'*, and a plugger-shaft provided with the screw *f* and enlargement *g*, of the loose sleeve *h* and spring *j*, substantially as and for the purposes set forth.

3. The combination, with the plugger-shaft C, sleeve *h*, spring *j*, and spring-tooth *k k'*, of the disengaging-pin *n*, substantially as set forth.

4. The combination, in a dental plugger, of a revolving shaft provided with a tool-socket, a hollow plugger-spindle, a locking-sleeve, *r*, and a burring-tool which passes from the shaft through the said hollow spindle and locking-sleeve, in the latter of which it has an outer bearing, substantially as set forth.

5. The combination, with the screw-plug B', hollow plugger-spindle L, and burring-tool, of the locking-sleeve *r*, substantially as set forth.

6. The combination, with the case, end piece B', plugger-spindle, and hammer, of the spring $l^2$, guide-pin *m*, and wire *n*, substantially as set forth.

7. A dental tool formed with a longitudinal passage or groove, terminating in a cross-groove, substantially as shown and set forth.

8. The rotary socket or holder provided with interior projection, as described, in combination with the dental tool formed with a longitudinal groove or passage, terminating in a cross-groove, substantially as shown and set forth.

In testimony whereof I have hereunto signed my name this 18th day of March, A. D. 1876.

IRVING M. SEAMAN.

Witnesses:

WILLIAM HIBBARD FOSTER,
CHARLES O. ROTHER.